United States Patent [19]

Petersson et al.

[11] Patent Number: 4,469,914

[45] Date of Patent: Sep. 4, 1984

[54] ARRANGEMENT FOR FITTING A CONNECTION BLOCK IN A COVER

[75] Inventors: Jan A. S. Petersson, Solna; Adalbert G. Schneider, Norrtälje; Lars G. Sjöberg, Handen, all of Sweden

[73] Assignee: Telefonaktiebolaget L M Ericsson, Stockholm, Sweden

[21] Appl. No.: 284,651

[22] PCT Filed: Dec. 3, 1980

[86] PCT No.: PCT/SE80/00311

§ 371 Date: Jul. 20, 1981

§ 102(e) Date: Jul. 20, 1981

[87] PCT Pub. No.: WO81/01773

PCT Pub. Date: Jun. 25, 1981

[30] Foreign Application Priority Data

Dec. 18, 1979 [SE] Sweden ............................... 7910434

[51] Int. Cl.³ ............................................. H02G 13/08

[52] U.S. Cl. ............................. 174/52 R; 339/198 R; 361/426

[58] Field of Search ............... 361/426, 356, 331, 334; 200/303; 339/18 R, 198 R, 198 H, 36, 39, 119 R, 123; 174/52 R

[56] References Cited

U.S. PATENT DOCUMENTS

| | | | |
|---|---|---|---|
| 3,013,105 | 12/1961 | Craig | 339/36 |
| 3,598,900 | 8/1971 | Drake | 339/36 |
| 3,710,224 | 1/1973 | Daniels | 339/119 R |
| 4,273,966 | 6/1981 | Briggs, Jr. | 361/426 |

*Primary Examiner*—G. P. Tolin

*Attorney, Agent, or Firm*—Roberts, Spiecens & Cohen

[57] ABSTRACT

An arrangement in a telecommunications system for fitting a connection block in a cover so that a complete connecting unit is obtained, which can be connected to the front edge of a circuit board or in the back plane of a rack containing circuit boards. The arrangement is characterized by a cover formed so that a standardized connection block can be inserted into the cover guidance via guiding pins in the cover through the screw holes in the block normally used for screwing the block to the cover. The cover is provided with resilient end walls from which bosses project towards the interior of the cover. When the block is inserted into the cover, the end walls (3) deflect outwardly but reassume their original position when the block is engaged against stops in the cover, the projecting bosses engaging over the edges of the short ends of the connection block to lock the block to the cover.

11 Claims, 3 Drawing Figures

ARRANGEMENT FOR FITTING A CONNECTION BLOCK IN A COVER

FIELD OF THE INVENTION

The invention relates to an arrangement in a telecommunications system for fitting a connection block in a cover so that a complete connecting means is obtained which can be connected to the front edge of a circuit board or in the back plane of a rack containing circuit boards.

DESCRIPTION OF PRIOR ART

In the Philips (Netherlands) data handbook from April 1978, Components and Materials, part 10, Connectors, there is shown under the catalogue number 433202625920 a typical example of how a connection block is attached in a cover by means of a plurality of screws. This is the most usual way in the art of fitting a connection block into a cover, the block being provided with rows of terminals to which wires are to be connected. The cover thereby serves as a protection for the terminals and wires.

In known embodiments, the problem occurs that the plastic material of the cover gradually cracks with repeated screwing or tightening with nuts in the material. A further problem is that when a complete connector, i.e. connection block and cover, is fitted to a circuit board and the cover needs to be removed, the whole connector must be removed so that the screws will be accessible, the electrical contact between board and connector thus being broken.

SUMMARY OF THE INVENTION

The arrangement in accordance with the invention solves the problem by the cover being so formed that a standardized connection block, e.g. of the type prescribed in DIN standard 41612 (IEC standard 130-14), is pushed into the cover and thereby obtains guiding by guiding pins in the cover through the screw holes in the block which are normally used for screwed attachment. The cover is provided with resilient end walls on which projecting bosses directed towards the interior of the cover are arranged. When the block is pushed into the cover, said end walls first deflect outwardly but reassume their original position when the block is pressed against the bottom of the cover, the bosses then snapping in over the edges of the short ends of the block to lock it to the cover. With the aid of a tool the cover can easily be removed from the block without interrupting the contact between the block and a connected circuit board. The advantages of the arrangement in accordance with the invention in relation to known arrangements is that apart from a stronger connector, there are also obtained large gains in time in fitting and removing the connector, due to the technically simple solution, which in turn give considerable economic advantages.

BRIEF DESCRIPTION OF THE DRAWINGS

The invention will now be described in detail with the aid of an embodiment, while referring to the attached drawing, in which.

PREFERRED EMBODIMENT

Figure 1:
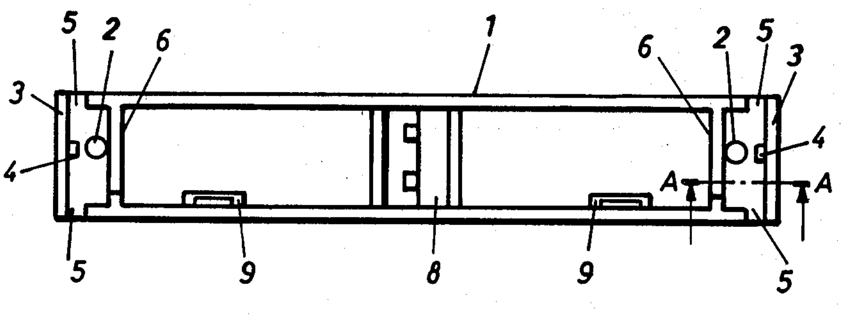
FIG. 1 is a front view of a cover in which a connection block can be inserted.

As is apparent from FIG. 1, a cover 1 (a plastic cover according to the example) is provided with guiding pins 2 in the vicinity of each short end, the task of these pins being to serve as guides for a connection block which is pressed into the cover. For said guidance the fact is utilized that the connection block is a standard block and the pins guide the block in the through-holes which in known embodiments are utilized for screws. It is thus not the connection block itself which is the inventive subject. It will be seen from the figure that both long sides of the cover 1 farthest out towards the end walls are provided with slits 5 so that resilient end walls 3 are obtained. Each of the end walls 3 is provided on the inside with a projecting boss 4 directed towards the guiding pin 2. The bosses 4 are at a small distance from the pins 2. The task of the bosses is to snap in over the edges of the short ends of the block when the latter is fitted into the cover, thereby locking it in the cover. In conjunction with the respective guiding pin, the cover is provided with a stop projection formed as a wall 6 of given height. The walls 6 have the task of defining the bottom position for the connection block in the cover. In the drawing, reference numerals 8 and 9 refer respectively to the cable inlet of the cover and spaces for locking means to circuit boards. These details are not pertinent to the inventive concept and are only illustrated to give a complete picture of the appearance of the cover, thereby to facilitate understanding the invention.

Figure 2:
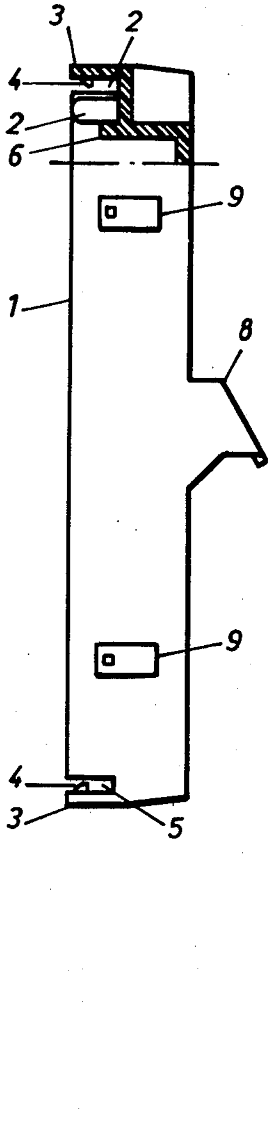
FIG. 2 is a side view of the cover, partly in section as taken along line A—A in FIG. 1.

FIG. 2 illustrates the cover from one side with the details in question in cross-section. When a connection block is inserted into the cover, the guiding pins 2 are located in the screw holes of the block. The end surfaces of the block simultaneously press against the projecting bosses 4 disposed on the resilient end walls 3. These bosses are formed with a slope obliquely outwards towards the bottom of the cover so that the block ends glide along the bosses and press the end walls 3 outwards. When the block comes into contact with the stop walls 6, the resilient end walls 3 deflect back and the bosses 4 snap in over the edge of the respective short end of the block to lock it to the cover.

Figure 3:
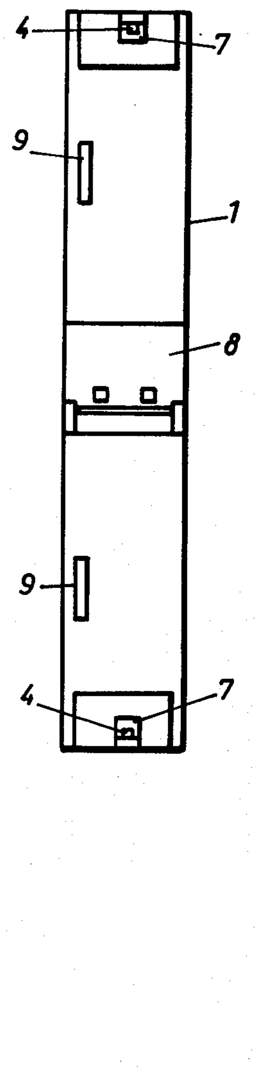
FIG. 3 is a rear view of the cover.

From FIG. 3, which shows the cover from the rear, it will be apparent that the cover is provided with openings 7 at the outer ends, through which openings the cover can easily be released from the block by a tool, without the block needing to be removed from the circuit board to which it is connected.

The object of the arrangement in accordance with the invention is thus to provide a cover with greater strength than in known arrangements, and to achieve a cover from which gives better economy by enabling a simple and rapid procedure when fitting and removing a block in the cover.

What we claim is:

1. An arrangement in a telecommunications system comprising a cover, and a connection block fitted in said cover so that a complete connecting means is obtained, which can be connected to the front edge of a circuit board or in the back plane of a rack containing circuit boards, the connection block having holes normally utilized for receiving screws to attach the cover to the block, said cover being provided with guiding pins guidably receiving the block in the cover via the holes provided in the block normally used for screws, said cover including resilient end walls including bosses projecting inwardly into the cover, said bosses snap-engaging edges of the connection block with the block inserted into the cover, said cover further including a rear wall from which said resilient end walls project, and upper and lower walls connected to said end walls and rear wall, said cover being provided with slits to provide said end walls with the resilience thereof to enable the bosses to snap-engage the edges of the connection block.

2. The arrangement as claimed in claim 1 wherein said slits are arranged in pairs for each end wall, the slits in each pair being on opposite sides of the respective bosses on the associated end walls.

3. The arrangement as claimed in claim 2 wherein said slits are provided between the end walls and the upper and lower walls.

4. The arrangement as claimed in claim 3 wherein said end walls have free edges extending along the length of the end walls and said bosses are spaced from the free edges of the respective end walls.

5. The arrangement as claimed in claim 4 wherein said cover includes a further wall adjacent each end wall, said projections being located on the further walls, said pins being located between respective end walls and further walls.

6. The arrangement as claimed in claim 1 wherein said cover is provided with holes which are externally accessible for removing the cover from the block with a tool.

7. The arrangement as claimed in claim 1 wherein rear wall has a length substantially greater than said end walls.

8. The arrangement as claimed in claim 1 wherein said bosses project into adjacent spaced relation with said guiding pins to permit the block to engage over said pins and be inserted into the cover whereupon the bosses snap-engage the block.

9. The arrangement as claimed in claim 1 wherein said bosses have sloped faces to provide the snap-engagement with the connection block.

10. The arrangement as claimed in claim 1 comprising stop projections on said cover for defining a fully inserted position for the block in the cover.

11. The arrangement as claimed in claim 1 wherein said bosses are substantially centrally located on said end walls.

* * * * *